United States Patent [19]

Braun et al.

[11] Patent Number: 4,722,957

[45] Date of Patent: Feb. 2, 1988

[54] HYDRAULIC SILICONE CRUMB WITH IMPROVED HEAT STABILITY

[75] Inventors: Joseph T. Braun; Schuyler B. Smith, both of Midland, Mich.

[73] Assignee: Dow Corning Corporation, Midland, Mich.

[21] Appl. No.: 944,291

[22] Filed: Dec. 19, 1986

[51] Int. Cl.$^4$ .............................................. C08K 5/24
[52] U.S. Cl. .................................... 524/262; 524/267; 524/394; 524/398; 524/588; 524/730; 524/731; 524/783; 524/862; 525/478; 528/15; 528/31; 528/32
[58] Field of Search ............... 524/262, 267, 394, 398, 524/588, 730, 731, 783, 862; 528/15, 31, 32; 525/478

[56] References Cited

U.S. PATENT DOCUMENTS

| | | | |
|---|---|---|---|
| 3,843,601 | 10/1974 | Bruner | 260/46.5 |
| 4,070,343 | 1/1978 | Kishimoto et al. | 260/46.75 |
| 4,122,109 | 10/1978 | Halm | 260/448.2 |

*Primary Examiner*—Melvyn I. Marquis
*Attorney, Agent, or Firm*—Roger H. Borrousch

[57] ABSTRACT

A silicone crumb in a fine particulate form has an extrusion rate of at least 50 grams per minute through an orifice of 0.5 inch diameter under a pressure of 345 kilopascals and compression points of less than 1035 kilopascals. This crumb is made from a vinyl-containing polyorganosiloxane, a silicon-bonded hydrogen containing polysiloxane, a platinum catalyst, and a heat stability additive compound containing zirconium, titanium, or hafnium and organosiloxane. The crumb is useful in hydraulic applications where it is exposed to temperatures above 500° F. for prolonged periods of time.

44 Claims, No Drawings

HYDRAULIC SILICONE CRUMB WITH IMPROVED HEAT STABILITY

BACKGROUND OF THE INVENTION

1. Field of the Invention

This invention relates to a silicone crumb which is useful as a hydraulic material which can be subjected to temperatures. such as 600° F. over long periods of time and maintain their usefulness.

2. Background Information

Material used in hydraulic systems are mainly fluid, i.e. gases or liquids. Such systems are used in machines to move parts of the equipment, for example in a hoist to lift automobiles. Other systems using hydraulics are the brakes on vehicles. The use of solid materials for hydraulic purposes is much more limited because most solids do not readily move and transfer pressure as conveniently as gases and liquids. Silicone fluids are used in hydraulic systems but these systems must be closed systems in the same manner as other hydraulic systems using gases or liquids. If the systems, using gases or liquids, are not closed, loss of material will occur and the effectiveness of the hydraulics is lost.

Other disadvantages of liquids is that if a leak should occur, it may cause undesirable environmental conditions and the cleanup may be difficult. Some liquids may be unstable under high temperature conditions and solidify or deteriorate such that the hydraulic system is ineffective for its purpose.

Solid materials which can be deformed might be suggested as useful material for hydraulic purposes and for use in methods for thermal expansion molding for composites. These thermal expansion molding methods use solid elastomeric materials in molds to cause pressure against a composite during the molding process. Such thermal expansion molding methods have the disadvantage that the determination of the pressure against the composite is difficult and requires very careful filling of the elastomeric mold portion because either under or over filling can cause unwanted pressures which result in bad composites. Because of the difficulty of using solid elastomeric materials in the thermal expansion molding methods, the expense is high enough to cause these methods to be used only in very special applications in which the expense would be acceptable. However, not much is reported for use of solid materials for hydraulic purposes because the solid materials do not flow.

Bruner in U.S. Pat. No. 3,843,601, issued Oct. 22. 1974, describes a hydraulic elastomer which is reported to have a high cross-link density and a high proportion of free chain ends. Bruner crumbles his elastomer under high shear stress to a powder which flows like a viscous fluid through a narrow orifice. Bruner reports that silicone elastomers are desirable materials for their high thermal stability, have high compressibility, and can be forced through an orifice. However, the silicone elastomers do not easily flow back into their original position because they are relatively hard. Oil has been used to plasticize the elastomer but this results in oil bleed which leaks out of the system. Bruner teaches that an improved hydraulic elastomer can be obtained by curing a linear vinyl containing siloxane copolymer which is made up of dimethylsiloxane units and methylvinylsiloxane units and which has a molecular weight between 20,000 and 200,000 corresponding to viscosities between 1000 and 1,000,000 centipoise at 25° C. The vinyl is present in Bruner s copolymer in an amount of from 0.1 to 0.9 mole percent. Bruner teaches that even with the optimum vinyl content it is found that the ultimate properties of the cured elastomers are not as good as when the viscosity of the fluid is at least 5000 cp and that good physical properties are obtained when the viscosity of the fluid reaches 1,000.000 cp. Bruner cures his vinyl containing copolymer with peroxide. Bruner teaches that those cured elastomers of his which have durometers on the Shore A scale of 8, 10, 19, 22, and 26 are outside the acceptable range of hardness which means that the acceptable hardness are those which have durometers on the Shore A scale between 11 and 18.

The solid materials which are useful for expansion molding of composites will require utility at temperatures above 500° F. if some of the new curable materials are used in making the composites, because many of these new curable materials require cure temperatures above 500° F. such as 600° F. or higher. Silicone crumbs are described by Beck et al. in U.S. Pat. application Ser. No. 835,496, filed Mar. 3, 1986, now U.S. Pat. No. 4,686,271, and assigned to the same assignee as the present application and is hereby incorporated by reference to show hydraulic silicone crumbs. These silicone crumbs of Beck et al are useful materials in expansion molding methods but when heated to higher temperature, such as 600° F. the silicone crumb begins to loose its effectiveness as a hydraulic material. This loss of hydraulic effectiveness is believed to be the result of decomposition products causing the crumb particles to stick together and thus the crumb cannot be readily moved, such as through a pipe. An improved hydraulic silicone crumb is therefore desirable, namely one in which the decomposition is minimized or eliminated at the higher temperatures, such as above 500° F.

The use of a heat stability additive in silicone rubber is known for example iron oxides and iron compounds have been known for a long time as heat stability additives to silicone rubber. Other heat stability additives which are known, are the cerium compounds and metallic zirconates. Kishimoto et al in U.S. Pat. No. 4,070,343, issued Jan. 24. 1978. teach, as a heat stability additive to organosiloxane polymers, a reaction product of an alkali metal siloxanolate having at least three organosiloxane units per molecule with a cerium salt of an organic carboxylic acid or cerium chloride and an organic carboxylic acid salt or alkoxy compound of zirconium, titanium. or iron. These additives taught by Kishimoto et al can be used to improve the heat stability of silicone sealants, silicone rubber gaskets, silicone fluids for hydraulic systems such as in automobile brake systems, and many other areas wherein silicone fluids and rubbers are used. The amounts of weight loss shown by Kishimoto et al of 2.6 to 6.7 weight percent after heating at 250° C. for 48 hours would be unacceptable for crumb rubber applications used exposed to temperatures above 500° F.

A heat stability additive for making endblocked methylpolysiloxane fluids more resistant to thermally induced siloxane rearrangement is described by Halm in U.S. Pat. No. 4,122,109. issued Oct. 24. 1978. which is hereby incorporated by reference to show the preparation of the heat stability additives used in the silicone crumb of the present invention and its preparation, Halm teaches, as the heat stability additive, the product obtained by mixing endblocked methylpolysiloxane fluid with an organometallic compound of zirconium, titanium, or hafnium. and heating the mixture to cause the decomposition of the organometallic compound; or an organometallic siloxy compound of zirconium, titanium, or hafnium with at least one Si-O-Zr, Si-O-Ti, and Si-O-Hf bond mixed with endblocked methylpolysiloxane. Halm also teaches that an improved heat stability additive can be formed by adding an organosilicon hydride compound. However, Halm reports teaches that organosilicon hydride compounds should not be added to a metal-containing methylpolysiloxane which contains more than 0.1 weight percent metal, because the loss of silicon-bonded hydrogen and the release of hydrogen gas may occur, particularly in the presence of moisture. Halm teaches that the amount of additive for endblocked methylpolysiloxane fluids is an amount sufficient to provide from 0.001 to 0.1 parts by weight of metal per 100 parts by weight of fluid to improve the resistance to thermal siloxane rearrangement.

SUMMARY OF THE INVENTION

An object of the present invention is to provide a silicone crumb which is easily compressed, extrudes well, provides a consistent pressure, controls the pressure to a predetermined value, readily flows like a liquid, does not agglomerate, and can be repeatedly recycled between crumb and clear liquid appearing material, and retains these properties after being heated above 500° F. for prolonged periods of time.

This invention relates to a silicone crumb comprising the cured product obtained by curing a mixture of (A) a vinylcontaining polyorganosiloxane consisting essentially of units, selected from the group consisting of diorganosiloxane units. monoorganosilsesquioxane units, triorganosiloxy units, and mixtures thereof in which the organic radicals are monovalent hydrocarbon radicals or monovalent halogenated hydrocarbon radicals, in the polyorganosiloxane the organic radicals being such that at least 0.1 weight percent of them are vinyl radicals, (B) a silicon-bonded hydrogen containing polysiloxane in which there is at least 0.5 weight percent silicon-bonded hydrogen atoms, the valences of the silicon atoms not being satisfied by divalent oxygen atoms or silicon-bonded hydrogen atoms are satisfied by monovalent hydrocarbon radicals or monovalent halogenated hydrocarbon radicals, (C) a platinum catalyst for the hydrosilation reaction of (A) and (B), (D) from 0.1 to 2 weight percent of a heat stability additive based on the total weight of the composition, wherein the heat stability additive is selected from the group consisting of the product obtained by mixing (1) a hydrocarbon endblocked polymethylsiloxane fluid having an average of from 1.9 to 3.0 methyl groups per silicon atom, and (2) an organometallic compound in sufficient amount to provide from more than 0.1 to 10.0 parts by weight of the metal per 100 parts by weight of the mixture of (1) plus (2), said organometallic compound being selected from the group consisting of organotitanium, organozirconium. and organohafnium compounds wherein each organic group consists of carbon, oxygen, and hydrogen atoms and which is bonded to the metal by at least one metal-oxygen-carbon linkage, and heating the mixture of (1) and (2) in an inert atmosphere to decompose the organometallic compound, and a mixture of (3) an endblocked polymethylsiloxane fluid having an average of from approximately 1.9 to less than 3.0 methyl groups per silicon and (4) a siloxy-metal compound in sufficient amount to provide more than 0.1 part by weight of the metal per 100 parts by weight of the mixture of (3) plus (4), said siloxy-metal compound being an organosilicon compound having at least one silicon-oxygen-titanium bond, one silicon-oxygen-zirconium bond, or one silicon-oxygen-hafnium bond, the cured product being in a fine particulate form which exhibits an extrusion rate of at least 50 grams per minute through an orifice of 0.5 inch diameter under a pressure of 345 kilopascals and compression points of less than 1035 kilopascals for the first two compressions.

DESCRIPTION OF THE PREFERRED EMBODIMENTS

The silicone crumb of the present invention is made by curing a composition comprising a vinyl-containing polyorganosiloxane, a silicon-bonded hydrogen-containing polysiloxane, a platinum catalyst, and a heat stability additive made by reacting an endblocked methylpolysiloxane fluid and an organozirconium compound, an organotitanium compound, or an organohafnium compound.

The vinyl-containing polyorganosiloxane of (A) are those which are made up of repeating units of diorganosiloxane units, monoorganosilsesquioxane units, and triorganosiloxy units. Other siloxane units can also be present in small amounts if the resulting properties can be obtained, for example $SiO_2$ units. The organic radicals of the polyorganosiloxane can be monovalent hydrocarbon radicals such as methyl, ethyl, propyl, isopropyl, butyl, octyl, phenyl, vinyl, allyl, and cyclohexyl, or monovalent halogenated hydrocarbon radicals such as chloropropyl, 3,3,3-trifluoropropyl. and 2-(perfluorobutyl)ethyl. Preferably, the organic radicals are methyl and vinyl. The polyorganosiloxane of (A) should contain at least 0.1 weight percent vinyl radical based on the total weight of the polyorganosiloxane. The most preferred polyorganosiloxanes of (A) because they provide the best property profile of extrusion rate (flow) and compression points (point at which the crumb changes into a clear solid) are branched polyorganosiloxanes containing a combination of diorganosiloxane units, monoorganosilsesquioxane units, and triorganosiloxy units. Preferably. these branched vinyl-containing polyorganosiloxanes are those described by Brown et al. in U.S. Pat. No. 4,374,967, issued Feb. 22. 1983, which is hereby incorporated by reference to show the preparation of the vinyl-containing polymethylsiloxanes and the polymethylsiloxanes per se. These vinyl-containing polymethylsiloxanes described by Brown et al. consist essentially of 80 to 96.5 mole percent of dimethylsiloxane units, 2 to 10 mole percent of methylsilsesquioxane units, 1.25 to 6.0 mole percent of trimethylsiloxy units, and 0.25 to 4.0 mole percent of vinyldimethylsiloxy units. The branched polyoranosiloxane of (A) preferably have a viscosity at 25° C. of less than 5 pascal-seconds.

Another preferred vinyl-containing polyorganosiloxane is a linear triorganosiloxy endblocked polymethylvinylsiloxane having a viscosity at 25° C. of less than 50 pascal-seconds. The most preferred are those which have trimethylsiloxy endblocking.

The silicon-bonded hydrogen-containing polysiloxane of (B) contains at least 0.5 weight percent hydrogen atom and the radicals bonded to the silicon atoms other than hydrogen atoms and divalent oxygen atoms are monovalent hydrocarbon radical or halogenated hydrocarbon radicals which are illustrated above for the polyorganosiloxane of (A). Preferably, the organic radicals are methyl. The preferred polysiloxanes of (B) are the trimethylsiloxy endblocked polymethylhydrogensiloxanes and those most preferred have 1.4 to 1.6 weight percent silicon-bonded hydrogen atoms.

The platinum catalyst (C) is a catalyst for the hydrosilation reaction between the vinyl radicals on the polyorganosiloxane of (A) and the SiH on the polysiloxane of (B). The platinum catalysts are well known in the art and can be selected from any of them, but the catalyst should be one which is compatible in the mixture of (A) and (B) for even distribution and even cure. The platinum catalysts include chloroplatinic acid and its hexahydrate as described in U.S. Pat. No. 2,823,218, issued Feb. 11, 1958 to Speier et al, and the reaction products of chloroplatinic acid with vinyl endblocked polysiloxane fluids such as sym-divinyltetramethyldisiloxane as described by Willing in U.S. Pat. No. 3,419,593, issued Dec. 31, 1968. The platinum catalysts described by Willing which are preferred are those which are complexes of a divinylsiloxane. Other platinum catalysts include the alkene complexes described by Ashby in U.S. Pat. No. 3,159,601, issued Dec. 1, 1964, and in U.S. Pat. No. 3,159,662. issued Dec. 1, 1964: the platinum acetylacetonate described by Baney in U.S. Pat. No. 3,723,497, issued March 27, 1973: the platinum alcoholates described by Lamoreaux in U.S. Pat. No. 3,220,972, issued Nov. 30, 1965, and in many more patents which describe other types of platinum catalysts. The foregoing patents describing platinum catalysts are hereby incorporated by reference to show the various types of platinum catalysts. The preferred platinum catalysts are those described by Willing.

The heat stability additive, (D), is a metal-containing methylpolysiloxane which is made by mixing certain siloxytitanium. siloxy-zirconium, or siloxy-hafnium compounds with a methylpolysiloxane, or the additive can be made by mixing organozirconium, organotitanium, or organohafnium compounds with methylpolysiloxane fluid and heating the resulting mixture. These heat stability additives are more fully described and their preparation in U.S. Pat. No. 4,122,109, cited above and incorporated by reference. The methylpolysiloxane fluids as used herein are the endblocked methylpolysiloxanes as defined in U.S. Pat. No. 4,122,109; therefore the general term "endblocked" refers to hydrocarbon endblocking groups such as methyl endblocks such as are present in trimethylsiloxane endblocks and does not include hydrolyzable endblocking groups such as hydroxy endblocks and alkoxy endblocks.

The organometallic compounds bear organic radical which contain atoms of carbon, hydrogen, and oxygen and which are bonded to the metal atoms by way of one or more metal-oxygen-carbon linkages. Examples of suitable organic radicals which are so bonded include the carboxylates such as propionate, butyrate, crotonate, octanoate, laurate, naphthenate, and benzoate: and the hydrocarbonoxides such as ethoxide, propoxide, butoxide, and phenoxide. Compounds included are the esters such as tetraethyltitanate and tetrabutylzirconate: the enolates such as the acetonates, phthalates, and the maleates. Preferably the organo-metallic compounds are soluble in the methylpolysiloxane. A preferred organometallic compound is the zirconium soaps which are long-chain monocarboxylic acid derivatives of zirconium, such as zirconium octanoate. The organozirconium compounds and the organohafnium compounds are well-known in the paint and polymer art as curing agents and catalysts; many of which are commercially available.

The siloxy-metal compounds are organosilicon compounds which have at least one siloxy-metal bond, i.e. at least one silicon-oxygen-titanium bond, silicon-oxygen-zirconium bond, or silicon-oxygen-hafnium bond per molecule and which are soluble in the methylpolysiloxane fluid. Preferably the siloxy-metal compound is non-volatile at room temperature and most preferably it is non-volatile at the maximum use temperature of the silicone crumb.

The organic groups on the silicon atom of the siloxy-metal compounds can be monovalent hydrocarbon radicals such as aliphatic radicals such as methyl, ethyl, isopropyl, vinyl, allyl, benzyl, and cyclohexyl, and aromatic radicals such as phenyl tolyl, and xenyl, and polyvalent hydrocarbon radicals such as alkylene radicals such as methylene, ethylene, propylene, butylene, and cylcohexylene, and arylene radicals such as phenylene and xenylene. Polyvalent hydrocarbon radicals may be joined to the same or different silicon atoms in the molecule. Any silicon valences in the siloxy-metal compound which are not satisfied by an oxygen-metal bond or by said hydrocarbon radicals are satisfied by divalent oxygen atoms which join silicon atoms to form siloxane linkages. The titanium, zirconium, or hafnium atoms in the siloxy-metal compounds have at least one organosiloxy group bonded thereto and may have only organosiloxy groups bonded thereto. Any Ti, Zr or Hf valences of the siloxy-metal compounds which are not satisfied by siloxy groups are satisfied by oxygen atoms, either singly or joined to other Ti, Zr, or Hf atoms. or by oxygen-bonded organic radicals such as are present in the organometallic compounds. One type of siloxy-metal compound is the polydimethylsiloxy-metal compound of the general formula $(-O\{(CH_3)_2SiO\}_y)_4M$ wherein M denotes Ti, Zr, or Hf, y is an integer greater than zero and the undesignated oxygen valence may be satisfied by an endblocking radical such as trimethylsiloxy or by an M atom. Another type of siloxy-metal compound is the tetrakistrimethylsiloxy-metal compound having the formula $\{(CH_3)_3SiO\}_4M$ where M denotes Ti, Zr, or Hf. Because of the propensity of M to coordinate, as well as bond, with oxygen atoms, the tetrakistrimethylsiloxy-metal compounds formula refers to the monomeric species and to any coordinated polymeric compound having the formula as a monomeric repeating unit. Furthermore, because the tetrakistrimethylsiloxy-metal compounds readily hydrolyze, there may be small amounts of partially hydrolyzed and condensed molecules bearing less than four trimethylsiloxy groups per M. The extent of the hydrolysis and condensation should not be so great as to render the siloxy-metal compound insoluble in the methylpolysiloxane fluid.

When the organometallic compound is used to make the heat stability additive, for the required heating step to decompose the organometallic compound, it is convenient to admix excess organometallic compound with methylpolysiloxane fluid and to heat the mixture to form a metal-rich thermal stability additive having more than 0.1 weight percent of metal. However, in order to avoid degradation of the methylpolysiloxane fluid during the heating step, the organometallic compound should not provide more than 10. preferably not more than 5. weight percent of the metal.

When the siloxy-metal compound is used to make the heat stability additive. it may also be admixed in excess with methylpolysiloxane fluid to form a metal-rich thermal-stability additive having more than 0.1 weight percent metal. In this case, the concentration of metal in the additive may exceed 10 weight percent, if desired, because no heating step to decompose the siloxy-metal compound is required as with the thermal stability additives prepared from organometallic compounds.

Thermal decomposition of the organometallic compound is done by heating the mixture of organometallic compound and methylpolysiloxane in an inert atmosphere under suitable conditions of time and temperature. By an inert atmosphere, it is meant an environment such as a vacuum or a nitrogen blanket or purge which will not react with the components of said mixture at the temperature that is used to decompose the organometallic compound. Conditions of time and temperature which are suitable for decomposing the organometallic compound will vary, depending upon the particular organometallic compound that is used. The times and temperatures for decomposition of the organometallic compound can be determined by simple experimentation. For example, the mixture of methylpolysiloxane and organometallic compound may be heated in a closed, inerted system equipped with a means for measuring system pressure. A temperature at which an increase of pressure with time is noticed in the system is indicative of a suitable decomposition temperature. Alternately, the particular organometallic compound to be used may be subjected to thermogravimetric analysis or differential thermal analysis in an inert atmosphere to determine the decomposition temperature. As a limiting example, the mixture of methylpolysiloxane fluid and organometallic compound may be heated to a temperature approaching, but not reaching, the thermal decomposition temperature of the methylpolysiloxane fluid for a period of from 6 to 24 hours. Preferably, the decomposition of the organometallic compound should be essentially complete.

The compositions of the present invention may begin to cure immediately when (A), (B), and (C) are mixed. If this curing reaction is too rapid, the curing can begin to take place before the ingredients are fully mixed and the result is an uneven cure. Therefore, certain compositions may desirably contain a platinum catalyst inhibitor which retards the hydrosilation reaction at room temperature. Many platinum catalyst inhibitors are known in the art and include, benzotriazole as described in U.S. Pat. No. 3,192,181. issued June 29, 1965; the acetylenic compounds described in U.S. Pat. No. 3,445,420, issued May 20, 1969; the aromatic heterocyclic nitrogen compounds, pyridazine, pyrazine, quinoline, 2,2'-biquinoline, bipyridine, naphthyridine, quinaldine, dialkyl formamides, thioamides, alkylthioureas and ethylene thiourea described in U.S. Pat. No. 3,188,299, issued June 8, 1965 the polymethylvinylsiloxane cyclics discussed in U.S. Pat. No. 3,923,705, issued Dec. 2, 1975, and many others. The preferred platinum catalyst inhibitors are the acetylenic compounds. The above patents related to platinum catalyst inhibitors are hereby incorporated by reference to show the various platinum catalyst inhibitors and their use in addition cure compositions (hydrosilation reaction).

The mixtures of the present invention can also contain other ingredients such as fillers. Some fillers may be used in small amounts, such a ground quartz or other non-reinforcing fillers, preferably, less than 5 weight percent. Other ingredients include heat stability additives, pigments or other colorants. However, the additives or the amounts used should not be detrimental to the crumb properties.

The amounts of (B) mixed with 100 parts by weight of (A) should be at least 0.1 part by weight. Preferably, (B) is present in an amount of at least 0.5 part by weight. The preferred amounts of (B) are from 0.5 to 10 parts by weight per 100 parts by weight of (A).

The amounts of (C) mixed with the mixtures of (A) and (B) should be at least one part by weight of platinum element per one million parts by weight of (A) and (B).

The amount of (D) used to make the silicone crumb of the present invention is from 0.1 to 1.5 weight percent heat stability additive.

The mole ratio of silicon-bonded vinyl to silicon-bonded hydrogen can vary broadly such as from 0.01:1 to 30:1.

The ingredients (A), (B), (C), and (D) are mixed and then cured to give the cured product which makes the crumb. The mixtures can be cured by letting it stand at room temperature or by heating it. After the mixture is cured, it is formed into crumbs by various techniques including crumbing by hand. The compositions of the present invention are not tough materials and can be readily formed into a crumb. Preferably, the cured product is put through a particle sizer, such as a screen to make the crumb particles more consistent in particle size distribution. The crumb of the present invention has an extrusion rate of at least 50 grams per minute, preferably at least 800 grams per minute. This extrusion rate is determined by packing the crumb into a Semco tube with an orifice of 0.5 inch. The crumb is then extruded through the orifice for 10 seconds at a pressure of 345 kilopascals. The extruded crumb is weighed and then multiplied by six to get grams per minutes. The extrusion rate of the crumb shows the ease with which the crumb can be transferred from one location to another such as in a brake system, i.e. the rate of flow. The extrusion rate also relates to the ease with which the crumb can be transported by pneumatic means. The higher the extrusion rates means the more easily the crumb will flow.

The crumb of the present invention also has compression points of less than 1035 kilopascals for the first two compressions. Compression points are determined by placing the crumb in a 10 milliliter syringe and pressing the plunger at the rate of one inch per minute using a tensiometer. The pressure at which the crumb goes from opaque to clear is recorded as the compression. The pressure is then released and the observance is made as to whether the clear material returns to crumb. Each compression and subsequent release of pressure is a cycle. In addition to the first compression, a crumb may be given four cycles. The compression points relate to the ease with which the crumb can be compressed and once in the compressed state, i.e. the clear. liquid appearing state, the pressure applied at any point in the system is transferred equally throughout the clear compressed state in the same manner as it is with a liquid. The subsequent release of the pressure to observe whether the crumb returns to its original crumb state shows the reusability of the silicone crumb of this invention.

The extrusion points of the crumb of this invention are also determined by placing the crumb in a syringe which has a 1/16 of an inch orifice. The extrusion point is determined by placing the syringe in a compression jig of a tensiometer and compressing at the rate of one inch per minute. The minimum pressure needed to push the crumb through the orifice is the extrusion point. The extrusion point is an indication of the ability of the crumb to leak from openings. The extrusion point also shows that the crumb stays put unless there is force being applied to the crumb and that once the force is removed the crumb will stop moving.

The crumb of the present invention is useful for brake systems and other systems which can use hydraulic materials. The crumb of the present invention can be used to control the pressure to a predetermined value by being a readily flowable material and the pressure can be controlled by adding crumb to increase the pressure and removing crumb from the system to reduce the pressure.

The crumb of the present invention is more reversion resistant under confined conditions at the same temperature and pressure than the peroxide cured hydraulic elastomer powder of Bruner. The crumb is also safe and non-intrusive, flowable, pressurizable medium and has high, unique expansion characteristics. These properties are important features for a material which is to be used in a closed system, especially for the hydraulic systems.

The crumb of the present invention has improved thermal stability at temperatures of greater than 500° F. such as at 600° F. in an inert environment. This improvement is shown by the reduction of cyclic polydimethylsiloxane formed during a 24 hour period at 600° F. in a sealed evacuated sample cylinder equipped with pressure gages. The crumb of the present invention does not agglomerate after exposure at 600° F. and become unusable. The silicone crumb of this invention can be used as described above but at temperatures above 500° F.

The following examples are for illustrative purposes and should not be construed as limiting the present invention which is properly delineated in the claims. The "parts" are parts by weight unless otherwise stated. The viscosities were measured at 25° C. unless otherwise specified.

EXAMPLE 1

A mixture of 100 parts vinyl-containing polymethylsiloxane containing 87.95 mole percent dimethylsiloxane units, 5.66 mole percent methylsilsesquioxane units, 5.57 mole percent trimethylsiloxy units, and 0.82 mole percent dimethylvinylsiloxy units, and having a viscosity of about 0.00045 square meters per second (m$^2$/sec) 1.0 part of a trimethylsiloxy endblocked polymethylhydrogensiloxane having a silicon-bonded hydrogen content of 1.55 weight percent, 0.25 part of a complex obtained by the reaction of chloroplatinic acid and sym-divinyltetramethyldisiloxane and diluted with a siloxane polymer to give 0.7 weight percent platinum element, 0.01 part of ethynylcyclohexanol, and an amount of a heat stability additive as shown in Table I was prepared and cured by heating at 150° C. for 10 minutes. The mixture had a molar ratio of vinyl radical to silicon-bonded hydrogen atom of about 0.7. The heat stability additive was prepared by mixing zirconium octanoate and trimethylsiloxy endblocked polydimethylsiloxane having a viscosity of 0.00002 m$^2$/sec and heating this mixture at 350° C. for 12 hours under vacuum to remove volatiles. The heat stability additive had about 3% zirconium. The cured product had a durometer on the Shore 00 scale of 58, a tensile strength at break of 13.8 kilopascals, and an elongation at break of 7%. The weight loss of the cured product was determined by heating it at 150° C. for two hours at 91.2 kilopascals and was 0.96 weight percent. The cured product was extruded through a 40 mesh screen to give a crumb which had particle sizes less than 0.42 mm. The extrusion Rate of the crumb was 1020 grams per minute, the extrusion point was 653 kilopascals, and the compression points were 810 kPa, 661 kPa, 677 kPa, and 565 kPa at compressions 1, 2, 3, 4, and 5 respectively.

The crumb for each material was placed in a sealed container equipped with a pressure gage and placed in an air circulating oven, which was then heated to 600° F. for 24 hours. The system was pressurized with Helium gas to check for leaks and then was evacuated with a laboratory vacuum pump. The vacuum was measured and recorded at room temperature and then the oven was heated to 600° F. The vacuum was then recorded at 600° F and the sample was held at temperature for 24 hours. The vacuum/pressure was measured and recorded after 24 hours and the oven was allowed to cool to room temperature at which time the vacuum/pressure was recorded. Four samples were prepared containing heat stability additive in amounts of 0% (the control), 0.75%, 1.0%, and 1.5% heat stability additive based on the total weight of the composition.

FIRST OVEN RUN

The crumbs evaluated all generated a positive pressure at 600° F. and when cooled to room temperature. The atmospheres of two samples (the control and the crumb with 1.5% heat stability additive) were captured in evacuation gas collection cylinders and were analyzed by Infrared. This analysis showed the materials generated were methane and polydimethylsiloxane cyclic with three and four siloxane units. The amount of methane produced was about the same in each case whereas the cyclic siloxane vapor content was about 15 times greater for the control than the crumb containing the 1.5a heat stability additive. The results observed were as shown in Table I.

SECOND OVEN RUN

The crumbs evaluated in this oven run were the control and the crumb with the 0.75% heat stability additive. The control sample was configured with a pressure gage capable of reaching 150 PSIG. whereas the other had a 30 PSIG maximum gage. The control sample generated a pressure of 121 PSIG at 600° F. and when cooled to room temperature was 21 PSIG, this compared to 12 PSIG at room temperature measured during the first oven run. The sample which contained 0.75% heat stability additive generated a pressure greater than 30 PSIG at 600° F. and when cooled to room temperature was 10 PSIG, which was greater than the pressure generated by the crumb having 1.5% heat stability additive (14 PSIG at 600° F. and 2.9 PSIG at room temperature. The results observed were as shown in Table I.

THIRD OVEN RUN

The crumb having 1.5% heat stability additive was repeated. The results were about the same as the first oven run. The results observed were as shown in Table I.

Crumbs were analyzed by extraction and GLC analysis to determine the amount of low molecular weight materials extractable from the crumbs. The tests were generated for the crumbs shown in Table II before and after exposure to the 600° F. temperature.

The crumbs which generated the highest pressures during the oven testing were the most difficult to remove from the test cylinders.

The compatibility of the heat stability additive with the silicone crumb, the control, was checked. An amount of heat stability additive as shown in Table III was added to the control and the solubility and visual appearance were observed. The results appear in Table III. The range tested from 0.1% to 1.5% showed good solubility and no interference with the cure of the composition was observed. 30 grams were cured in each case by heating for one hour at 150° C. in an aluminum weighing dish. All the samples cured to dry, rubbery materials. All the samples were soluble and formed solutions which were crystal clear, however some samples did show some color formation. The durometer. Shore "00" of the cured materials were tested for some of the samples. The addition of the heat stability additive did not result in any significant durometer changes over these concentrations.

TABLE I

| CRUMB % ADDITIVE | PRESSURE MEASUREMENTS DURING THERMAL TESTS | | | |
| --- | --- | --- | --- | --- |
| | INITIAL AT 25° C. in Hg vac | INITIAL AT 600° F. in Hg vac | 24 HOURS AT 600° F. PSIG | FINAL AT 25° C. PSIG |
| CONTROL | 27.8 | 19.0 | >30* | 12 |
| REPEAT CONTROL | >30 | 22 | 121*** | 21 |
| 0.75% | 27.5 | 14.0 | >30* | 10 |
| 1.0% | 29.1 | 18.5 | >15** | 2.9 |
| 1.5% | 27.5 | 16.5 | 14* | 2.9 |
| REPEAT 1.5% | 27.0 | 22.0 | 29* | 10.5 |

*Gage = 30 in Hg vac to 30 PSIG
**Gage = 30 in Hg vac to 15 PSIG
***Gage = 30 in Hg vac to 150 PSIG

TABLE II

| EXTRACTION/GLC ANALYSIS OF CRUMB | |
| --- | --- |
| CRUMB CONTROL | TOTAL % CYCLICS IN CRUMB |
| Before | 1.24 |
| After | 2.91 |
| 1.5% ADDITIVE | |
| Before | 1.55 |
| After | 1.49 |
| After (repeat) | 1.20 |

TABLE III

| CRUMB % ADDITIVE | DUROMETER SHORE "OO" | APPEARANCE VISUAL |
| --- | --- | --- |
| 0.00 | 58 | WATER-WHITE |
| 0.10 | — | WATER-WHITE |
| 0.20 | — | WATER-WHITE |
| 0.30 | — | WATER-WHITE |
| 0.50 | 58 | PALE AMBER |
| 0.75 | 58 | PALE AMBER |
| 1.00 | 55 | MEDIUM AMBER |
| 1.25 | 56 | MEDIUM AMBER |
| 1.50 | 54 | MEDIUM AMBER |

That which is claimed is:

1. A silicone crumb comprising the cured product obtained by curing a mixture of
(A) a vinyl-containing polyorganosiloxane consisting essentially of units selected from the group consisting of diorganosiloxane units, monoorganosilsesquioxane units, triorganosiloxy units, and mixtures thereof in which the organic radicals are monovalent hydrocarbon radicals or monovalent halogenated hydrocarbon radicals, in the polyorganosiloxane the organic radicals being such that at least 0.1 weight percent of them are vinyl radicals,
(B) a silicon-bonded hydrogen containing polysiloxane in which there is at least 0.5 weight percent silicon-bonded hydrogen atoms, the valences of the silicon atoms not being satisfied by divalent oxygen atoms or silicon-bonded hydrogen atoms are satisfied by monovalent hydrocarbon radicals or monovalent halogenated hydrocarbon radicals,
(C) a platinum catalyst for the hydrosilation reaction of (A) and (B),
(D) from 0.1 to 2 weight percent of a heat stability additive based on the total weight of the composition, wherein the heat stability additive is selected from the group consisting of the product obtained by mixing (1) a hydrocarbon endblocked polymethylsiloxane fluid having an average of from 1.9 to 3.0 methyl groups per silicon atom, and (2) an organometallic compound in sufficient amount to provide from more than 0.1 to 10.0 parts by weight of the metal per 100 parts by weight of the mixture of (1) plus (2), said organometallic compound being selected from the group consisting of organotitanium, organozirconium, and organohafnium compounds wherein each organic group consists of carbon, oxygen, and hydrogen atoms and which is bonded to the metal by at least one metal-oxygen-carbon linkage, and heating the mixture of (1) and (2) in an inert atmosphere to decompose the organometallic compound, and a mixture of (3) a hydrocarbon endblocked polymethylsiloxane fluid having an average of from approximately 1.9 to less than 3.0 methyl groups per silicon and (4) a siloxy-metal compound in sufficient amount to provide more than 0.1 part by weight of the metal per 100 parts by weight of the mixture of (3) plus (4), said siloxy-metal compound being an organosilicon compound having at least one silicon-oxygen-titanium bond, one silicon-oxygen-zirconium bond, or one silicon-oxygen-hafnium bond, the cured product being in a fine particulate form which exhibits an extrusion rate of at least 50 grams per minute through an orifice of 0.5 inch diameter under a pressure of 345 kilopascals and compression points of less than 1035 kilopascals for the first two compressions.

2. The silicone crumb according to claim 1 in which the heat stability additive is the product obtained by heating (1) and (2) and the organometallic compound is a zirconium soap.

3. The silicone crumb according to claim 2 in which the polymethylsiloxane fluid (1) is a trimethylsiloxy endblocked polydimethylsiloxane fluid.

4. The silicone crumb according to claim 3 in which the zirconium soap is zirconium octanoate and the mixture of (1) plus (2) is heated to approximately 350° C. for at least 6 hours.

5. The silicone crumb according to claim 4 in which the zirconium octanoate provides up to 3.0 parts by weight zirconium per 100 parts by weight of the mixture of (1) plus (2).

6. The silicone crumb in accordance with claim 2 in which the vinyl-containing polyorganosiloxane of (A) is made up of a combination of diorganosiloxane units, monoorganosilsesquioxane units, and triorganosiloxy units.

7. The silicone crumb in accordance with claim 6 in which the organic radicals are methyl and vinyl.

8. The silicone crumb in accordance with claim 7 in which the diorganosiloxane units are dimethylsiloxane units, the monoorganosilsesquioxane units are methylsilsesquioxane units, and the triorganosiloxy units are trimethylsiloxy units and dimethylvinylsiloxy units.

9. The silicone crumb in accordance with claim 8 in which the vinyl-containing polyorganosiloxane has a viscosity at 25° C. of less than 5 pascal-seconds.

10. The silicone crumb in accordance with claim 2 in which the silicon-bonded hydrogen containing polysiloxane is a trimethylsiloxy endblocked polymethylhydrogensiloxane.

11. The silicone crumb in accordance with claim 6 in which the silicon-bonded hydrogen-containing polysiloxane is a trimethylsiloxy endblocked polymethylhydrogensiloxane.

12. The silicone crumb in accordance with claim 7 in which the silicon-bonded hydrogen containing polysiloxane is a trimethylsiloxy endblocked polymethylhydrogensiloxane.

13. The silicone crumb in accordance with claim 8 in which the silicon-bonded hydrogen-containing polysiloxane is a trimethylsiloxy endblocked polymethylhydrogensiloxane.

14. The silicone crumb in accordance with claim 9 in which the silicon-bonded hydrogen-containing polysiloxane is a trimethylsiloxy endblocked polymethylhydrogensiloxane.

15. The silicone crumb in accordance with claim 2 further comprising a platinum catalyst inhibitor for inhibiting the hydrosilation reaction at room temperature.

16. The silicone crumb in accordance with claim 6 further comprising a platinum catalyst inhibitor for inhibiting the hydrosilation reaction at room temperature.

17. The silicone crumb in accordance with claim 9 further comprising a platinum catalyst inhibitor for inhibiting the hydrosilation reaction at room temperature.

18. The silicone crumb in accordance with claim 10 further comprising a platinum catalyst inhibitor for inhibiting the hydrosilation reaction at room temperature.

19. The silicone crumb in accordance with claim 14 further comprising a platinum catalyst inhibitor for inhibiting the hydrosilation reaction at room temperature.

20. The silicone crumb in accordance with claim 2 in which the platinum catalyst (C) is a complex made from chloroplatinic acid and a divinylsiloxane.

21. The silicone crumb in accordance with claim 6 in which the platinum catalyst (C) is a complex made from chloroplatinic acid and a divinylsiloxane.

22. The silicone crumb in accordance with claim 9 in which the platinum catalyst (C) is a complex made from chloroplatinic acid and a divinylsiloxane.

23. The silicone crumb in accordance with claim 10 in which the platinum catalyst (C) is a complex made from chloroplatinic acid and a divinylsiloxane.

24. The silicone crumb in accordance with claim 14 in which the platinum catalyst (C) is a complex made from chloroplatinic acid and a divinylsiloxane.

25. The silicone crumb in accordance with claim 19 in which the platinum catalyst (C) is a complex made from chloroplatinic acid and a divinylsiloxane.

26. The silicone crumb in accordance with claim 1 further comprising a filler.

27. The silicone crumb in accordance with claim 2 further comprising a filler.

28. The silicone crumb in accordance with claim 5 further comprising a filler.

29. The silicone crumb in accordance with claim 10 further comprising a filler.

30. The silicone crumb in accordance with claim 15 further comprising a filler.

31. The silicone crumb in accordance with claim 16 further comprising a filler.

32. The silicone crumb in accordance with claim 21 further comprising a filler.

33. The silicone crumb in accordance with claim 1 in which the vinyl-containing polyorganosiloxane of (A) is a triorganosiloxy endblocked polymethylvinylsiloxane having a viscosity at 25° C. of less than 50 pascal-seconds.

34. The silicone crumb in accordance with claim 33 in which the triorganosiloxy of the polymethylvinylsiloxane of (A) is dimethylvinylsiloxy.

35. The silicone crumb in accordance with claim 34 in which the silicon-bonded hydrogen containing polysiloxane is a trimethylsiloxy endblocked polymethylhydrogensiloxane.

36. The silicone crumb in accordance with claim 35 further comprising a platinum catalyst inhibitor for inhibiting the hydrosilation reaction at room temperature.

37. The silicone crumb in accordance With claim 36 in which the platinum catalyst (C) is a complex made from chloroplatinic acid and a divinylsiloxane.

38. The silicone crumb in accordance with claim 37 further comprising a filler.

39. The silicone crumb in accordance with claim 1 in which the extrusion rate is at least 800 grams per minute.

40. The silicone crumb in accordance with claim 8 in which the extrusion rate is at least 800 grams per minute.

41. The silicone crumb in accordance with claim 9 in which the extrusion rate is at least 800 grams per minute.

42. The silicone crumb in accordance with claim 14 in which the extrusion rate is at least 800 grams per minute.

43. The silicone crumb in accordance with claim 19 in which the extrusion rate is at least 800 grams per minute.

44. The silicone crumb in accordance with claim 24 in which the extrusion rate is at least 800 grams per minute.

* * * * *